March 12, 1968 J. M. UNK 3,373,417

POSITIONER FOR MAGNETIC HEADS COACTING WITH MULTITRACK MAGNETIC RECORDS

Filed May 14, 1965 4 Sheets-Sheet 1

INVENTOR.
JAAP M. UNK

BY

AGENT

March 12, 1968 J. M. UNK 3,373,417

POSITIONER FOR MAGNETIC HEADS COACTING WITH MULTITRACK MAGNETIC RECORDS

Filed May 14, 1965 4 Sheets-Sheet 2

INVENTOR
JAAP M. UNK

BY Frank R. Jifani
AGENT

March 12, 1968 J. M. UNK 3,373,417

POSITIONER FOR MAGNETIC HEADS COACTING WITH MULTITRACK MAGNETIC RECORDS

Filed May 14, 1965 4 Sheets-Sheet 3

INVENTOR
JAAP M. UNK

BY [signature]
AGENT

INVENTOR
JAAP M. UNK
BY Frank R. Trifari
AGENT 3,373,417

POSITIONER FOR MAGNETIC HEADS COACTING WITH MULTITRACK MAGNETIC RECORDS

Jaap M. Unk, Hilversum, Netherlands, assignor to North American Philips Company, Inc., New York, N.Y., a corporation of Delaware Filed May 14, 1965, Ser. No. 455,756
4 Claims. (Cl. 340—174.1)

This invention pertains to positioning devices for magnetic heads used in the process of recording or reading information on magnetic records. It relates in particular to electromechanical positioning devices wherein one head is adapted to co-act with one of a plurality of tracks located on the recording medium and wherein the position of the head may be permutationally controlled in response to a plurality of input signals.

Various methods for building such positioning devices have already been proposed. Among these may be mentioned hydraulic-pneumatic and electromechanical arrangements. All of these methods have drawbacks, however, especially when a large number of recording media, such as drums and discs, are to be used as a unit or a plurality of units. It will be appreciated that when many magnetic drums or discs are in use at one time, with one or more magnetic heads co-acting with a large number of magnetic tracks on each, certain of the heads may be reading or writing information while others are in the process of being positioned. In order to prevent inaccuracies in writing or reading it is therefore necessary that mechanical shocks and vibration be avoided as much as possible and that acceleration and deceleration forces be reduced to a minimum. Hydraulic-pneumatic arrangements inherently introduce large mechanical shocks and vibration even when closely controlled; the acceleration and deceleration forces attendant on positioning the magnetic heads in prior art electromechanical positioning arrangements also produce shocks and vibration which can be considerable obstacles to obtaining trouble-free operation when a number of drums or discs are in use at one time.

A primary object of the invention is to provide a novel arrangement of apparatus whereby one or a plurality of magnetic heads may be selectively positioned to co-act with a track of a multi-track magnetic record with a minimum of shock, vibration and acceleration and deceleration forces.

Among further objects of the invention are the following:

To provide electromechanical means for accurately positioning one or a plurality of magnetic heads for coaction with selected tracks of multi-track magnetic records, the position of each head at each desired track being fixed and accurately determinable;

To provide means for selectively positioning one or a plurality of magnetic heads, with the heads and corresponding portions of the positioning mechanism having movements which give a minimum of shock and vibration to the system;

To provide a novel arrangement of electromechanical apparatus for providing rapid access to desired tracks of multi-track magnetic records with a minimum of acceleration and deceleration forces; and To provide a novel arangement of apparatus for positioning magnetic heads utilizing a plurality of levers which are permutationally controlled in response to a binary-coded input signal.

The positioning apparatus of the invention comprises in part a plurality of differential levers each of which is selectively actuated in response to input signals which collectively constitute a code indicating a desired track. The motions of the various levers are reduced and their positions are permutatively combined to produce a resultant motion which is followed by the magnetic head, the latter assuming a final position principally determined by the final positions of the levers. Thus the effect of the differential levers is to provide a mechanism for motion reduction and position permutation.

A feature of the invention is the manner in which the levers are actuated: the movement of each is sinusoidal with respect to time, thus insuring that each start and stop of a head will be relatively slow, thereby considerably reducing acceleration and deceleration forces.

Another feature of the invention is a combination of coarse and fine positioning, with the final position of the head being accurately determined by a fine positioning mechanism which insures that precisely the same track is reached by the head every time the same input signal is applied to the positioner.

The above and further objects and features of this invention will be more apparent from the following detailed description and accompanying drawing which disclose the inventive concept and various modes of practicing it.

In the drawing, which shows examples of preferred embodiments and wherein like reference numerals denote like elements:

Figure 1:
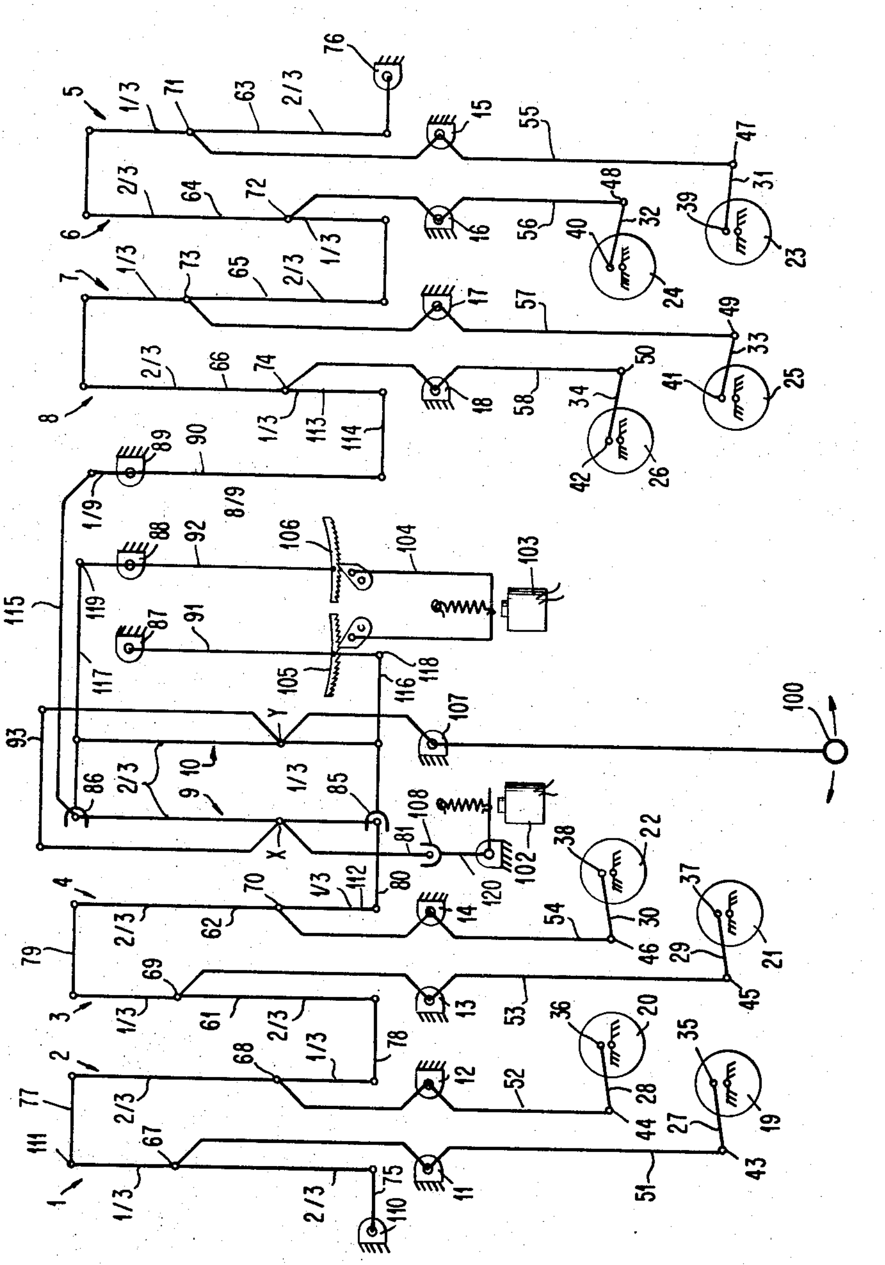
FIG. 1 is a line action diagram of one embodiment of the invention.
Figure 2:
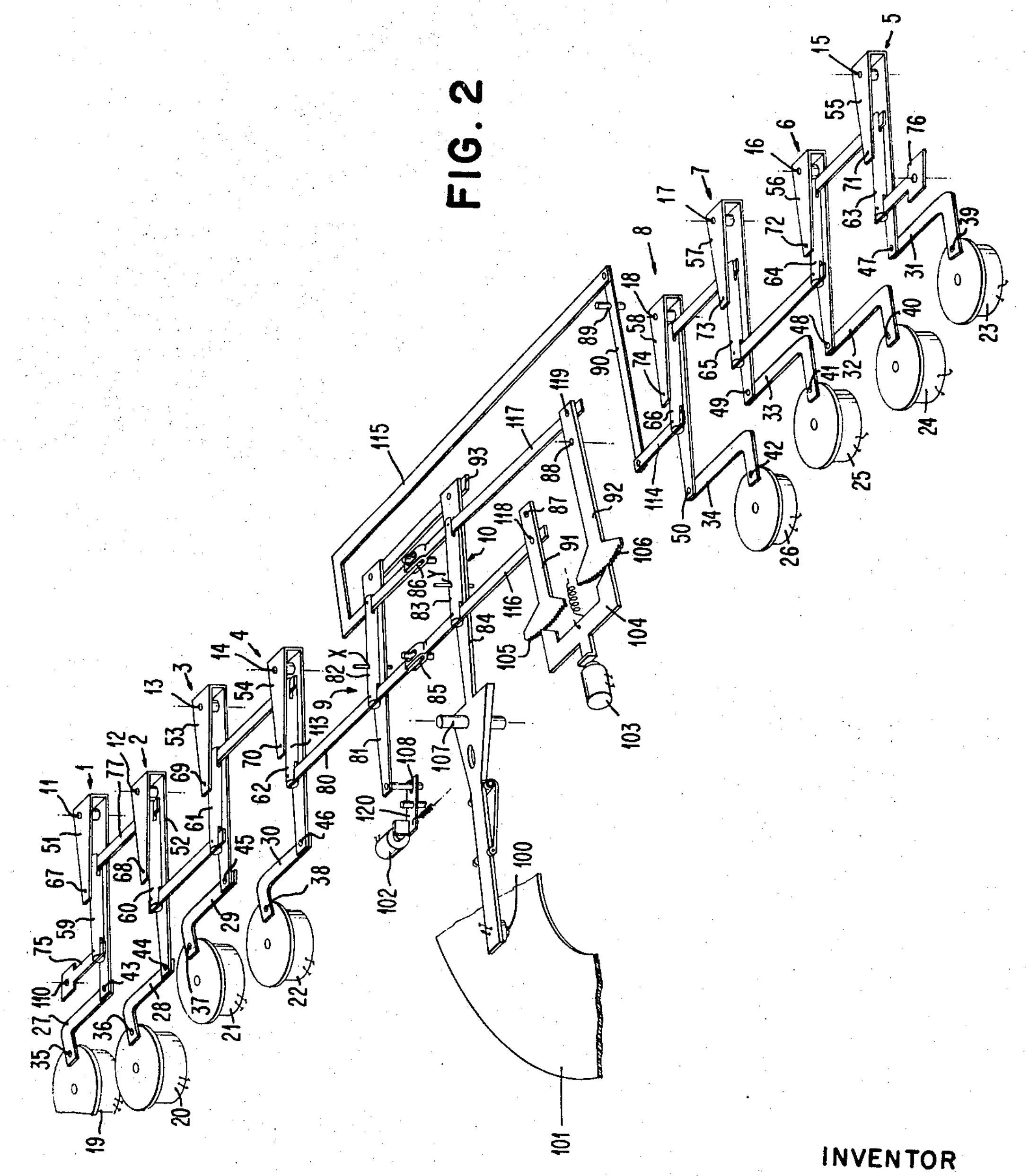
FIG. 2 is a pictorial representation of the embodiment of FIG. 1.

Referring now to FIGS. 1 and 2, eight differential levers are shown and are designated generally by reference numerals 1–8. The levers 1–8 have fulcrum or pivot points 11–18 respectively and are driven by drivers 19–26 respectively. The drivers and levers serve to actuate the magnetic head 100. Each driver is preferably constituted by a self-starting synchronous electric motor which is capable of rotating 180° clockwise or counterclockwise in response to an applied pulse. Such motors are well-known in the electrical art and an example thereof is the Philips type AU5050 motor. The specific design of the motor forms no part of this invention.

Also shown in FIGS. 1 and 2 are a plurality of motor links 27–34 which serve to couple the drivers to their respective differential levers and transmit motion thereto. Each motor link is coupled to its associated driver and differential lever by turning pairs as shown. The turning pairs between the motor links and the drivers are designated by reference numerals 35–42 respectively and those between the motor links and the differential levers are designated by reference numerals 43–49 respectively.

As can be seen from FIGS. 1 and 2, all of the differential levers are preferably identical in construction and function, each comprising two rigid members. The first of these rigid members is labeled 51–58 respectively and the second rigid member is labeled 59–66 respectively. The two rigid members of each differential lever form a turning paid designated by reference numerals 67–74 respectively. As shown in FIG. 2, and advantageous form for each of the first rigid members 51–58 is a U-shape or one in which it is folded back on itself. The fulcrum or pivot points 11–18 are formed by bores which are adapted to be placed in shafts to achieve the pivoting action. Each of the second rigid members 59–66 is located between the folded-over portions and the turning pairs 67–74 are formed by placing pins extending through the members 59–66 and both folded-over portions of the members 51–58 respectively. The point at which each of the members 59–66 is turnably joined to the members 51–58 is one which bears a distinct fractional relationship to its total length. According to the invention, this point is chosen such that a 2:1 relationship exists between the ends of each member 59–66 and the turning pairs 67–74. In other words, the length from each of the turning pairs 67–74 to one end of each of members 59–66 is twice the length to the other end. It is this 2:1 relationship, indicated by the fractional notation in FIG. 1, which gives each lever 1–8 its differential character and forms the basis of the motion reduction feature of the invention. The manner of its functioning will be explained below.

Figures 4, 6:
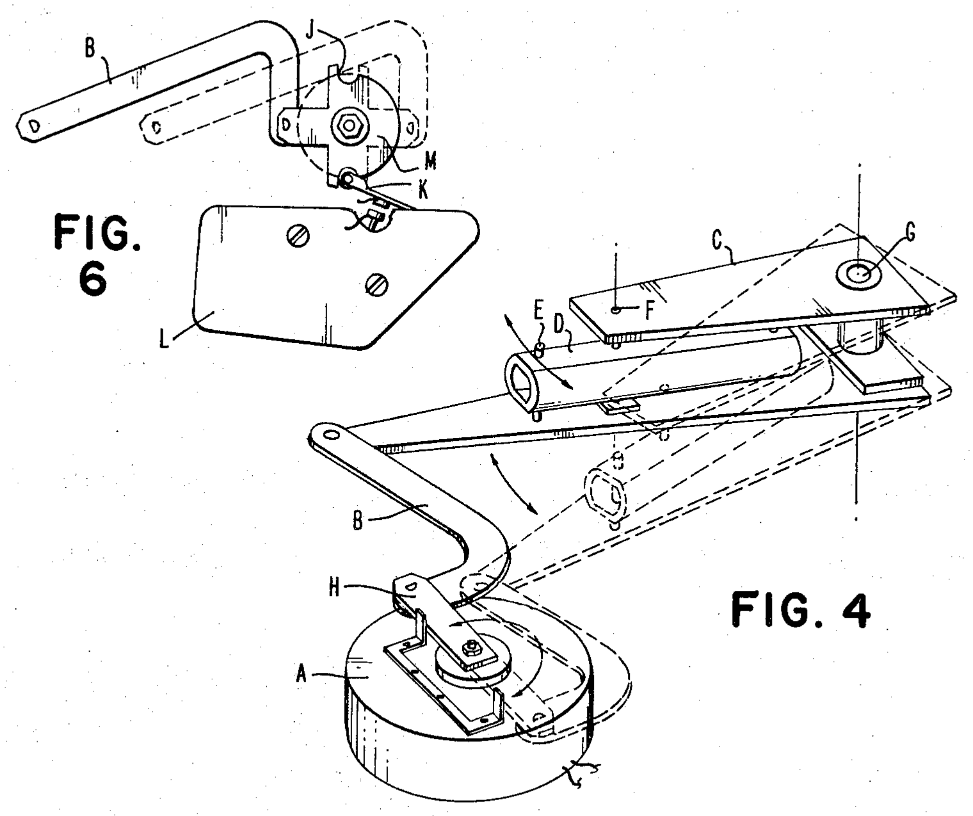
FIG. 4 is an enlarged view of one of the differential levers of FIGS. 1, 2 or 3.
FIG. 6 is a plan view of a modification of the driver linkage of FIG. 4.

As stated above, a feature of the invention is the reduction to a minimum of mechanical shocks and vibration as well as acceleration and deceleration forces in the system. This is accomplished according to the invention by the manner in which the drivers are coupled to the differential levers. The coupling is such that all motion in the system, including the motion of the magnetic heads, is sinusoidal with respect to time. Taking as an example the driving system for differential lever 1, the driver 19 will rotate 180° either clockwise or counterclockwise in response to an input signal. For the sake of uniformity in explanation, all the drivers 19–26 in FIGS. 1 and 2 are shown in a dead-center position midway in their stroke; this is an unstable position. The two stable positions of a motor such as that preferred for the invention will be 180° apart and the motor will normally be in one of these two positions. In response to an input pulse having a polarity causing motor 19 to assume the other stable position, therefore, turning pair 35 will rotate 180° either clockwise or counterclockwise depending on its initial position and the polarity of the input pulse. This rotational movement will actuate motor link 27. Turning pair 43 will therefore also move but its movement is constrained since it is located at the end of rigid member 51, and the only motion of the latter is rotational around pivot 11. The motion of turning pair 43 is therefore rotational about pivot 11, but it will be appreciated that the movements here involved are relatively small; for example, the total movement of turning pair 67 is between two fixed points which may be about 20 mm. apart. For this distance, the motion of turning pair 43 is almost translational compared to the 180° arcuate movement of turning pair 35. The link 27 and lever 51 can be relatively dimensioned to make the movement of turning pair 43 very close to translational relative to the rotational movement of turning pair 35. This action of the link 27 is similar to that of the well-known drive wheel link on steam locomotives except that the wheel is the driver in the present invention, while the piston, which is the driver in the locomotive, is in this case the driven member. An expanded view of a differential lever and its driver are shown in FIGURE 4, reference to which will be made below.

It is thus seen that the turning pairs or driven points 43–50 and 67–74 of all the levers are given motions which are substantially sinusoidal with time. It is well-known that such motion permits relatively slow starts and stops and for a given distance and a given time will produce minimal acceleration and deceleration forces.

It is noted at this point that FIGS. 1 and 2 show eight drivers 19–26 which, as stated above, are preferably self-starting synchronous electric motors each of which, in response to an input pulse, rotates 180° clockwise or counterclockwise. The input signal to the device of FIGS. 1 and 2 therefore consists of eight binary digits (bits). A total of $2^8$ or 256 permutations are possible from eight bits; levers 1–8 together with the additional lever 9 function according to the invention to produce these 256 permutations, and additional means are also provided to permit magnetic head 100 to assume 256 distinct and predetermined positions corresponding to the 256 permutations of the eight-bit binary input signal. The number of input bits, however, is illustrative only and, depending on the number of tracks desired on the magnetic record carrier, more or less motors and corresponding levers could be used. For example, a six-bit input signal will provide access to 64 tracks and for this input signal only six motors and six differential levers of the type shown need be used.

For the description of the operation, the action of driver 19 and its associated differential lever 1 will be taken as illustrative. When driver 19 is actuated in response to an input signal, it will rotate 180° clockwise or counterclockwise. This will cause differential lever 1 to pivot around point 11. Turning pair or joint 67 will therefore be pivoted about point 11 and will have two distinct positions corresponding to the extreme driven positions of driver 19. The rigid member 59 of lever 1 is, however, turnably coupled to one end of the link 75; the other end of link 75 is pivotable about pivot point 110. Thus, the ends of member 59 will be constrained to take a position different from that of member 51. Due to the 2:1 relationship between the turning pair 67 and the respective ends of member 59, the end 111 of member 59 will move a distance which is substantially one-half that of the distance through which turning pair 67 moves. Member 59 of lever 1 is coupled to member 60 of lever 2 through link 77, the coupling being by means of turning pairs; it can be seen from FIGS. 1 and 2 that links 78 and 79 act similarly to couple members 60, 61 and 62. The coupling of links 75 and 77–79 is made to the ends of members 59–62 having the relative distances to the respective turning pairs as shown. Thus, link 77 is coupled to the end of member 59 whose length from turning pair 67 is one-third that of the total length of member 59; link 77 is also coupled to the end of member 60 whose length from turning pair 68 is two-thirds that of the total length of member 60.

It is thus seen that the movement driver 19 is reduced by one-sixteenth through the action of levers 1–4 and associated links 75 and 77–79. Corresponding reductions are achieved for the remaining drivers. Thus, for example, the movement of driver 20 will be reduced by one-eighth and the movement of driver 21 will be reduced by one-quarter. Due to this arrangement of links and differential levers, the end 112 of member 62 will have 16 different positions corresponding to a permutation of the two positions of each of the four drivers 19–22.

The relationship between drivers 23–26 and differential levers 5–8, and their associated links is the same as that for drivers 19–22. Thus, end 112 of member 66 will also have 16 different positions corresponding to a permutation of the two positions of each of the four drivers 23–26. Due to the 2:1 relationship in each lever, the 16 different positions are equidistant.

The 16 positions of end 112 and the 16 positions of end 113 are added together by the lever 9; the output, indicated as point X, will have 256 distinct positions. End 112 of member 62 is coupled to lever 9 by means of link 80, with turning pairs at both ends of link 80. Lever 9 comprises rigid members 81 and 82; link 80 is coupled to member 82. Similarly, end 113 of member 66 is coupled to the other end of member 82 by means of links 114, 90, and 115, the coupling of link 115 to member 82 being by means of a turning pair. Point X bears a 2:1 relationship to the respective ends of member 82. Pivot point 89 of link 90 bears an 8:1 relationship to the respective ends of link 90. Thus, the movement of point 113 is reduced one-sixteenth before being added to the movement of point 112 at point X. This additional one-sixteenth reduction is necessary in order to keep the outer limts of the 256 output positions within acceptable, predetermined limits suitable for the positioning device and for the disc 101.

Due to the tolerances of the mechanism, the 256 positions of point X are not precise enough to be accurately predeterminable each time for the same positions of the drivers. For this reason, the output at point X represents what might be called coarse positioning. Point X therefore does not drive magnetic head 100 directly. A fine positioning mechanism is provided to obtain an accurate positioning after the eight drivers have reached their final positions.

The fine positioning mechanism, which provides accurately predeterminable positioning, operates as follows:

It is first noted that the accurately predeterminable positioning is achieved by means of ratchets or cam segments 105 and 106. In FIGURES 1 and 2, each of these ratchets has 16 teeth, the teeth of ratchet 105 corresponding to the 16 positions of point 112, and the teeth of ratchet 106 corresponding to the 16 positions of point 113. Ratchet 105 is located on lever 91 which is pivoted at 87; ratchet 106 is located on lever 92 which is pivoted at 88. Links 116 and 117 are attached to and actuate levers 91 and 92 by means of turning pairs 118 and 119, respectively. Links 116 and 117 are releasably attached to links 80 and 115 respectively by means of yoke and pin arrangements 85 and 86 respectively.

At the same time that the input signals are applied to the drivers, lock magnet 102 and stop magnet 103 are both energized. When stop magnet 103 is energized, the pawl actuating lever 104 releases the pawls from the teeth of ratchets 105 and 106. Upon energization of stop magnet 103, arm 120 is pivoted. The pivoting action of arm 120 forces yoke 108 against member 81 which in turn forces link 80 into rigid engagement with link 116, and also forces link 115 into rigid engagement with link 117. This rigid engagement is produced due to the provision of link 93, which is turnably coupled to member 81 and head arm 84, the latter being pivoted at 107. Link 116 is normally separated from link 80 by the yoke and pin arrangement 85 while link 117 is normally separated from link 115 by a similar yoke and pin arrangement 86. When lock magnet 102 is energized, member 81 will tend to pivot about point 107, thereby forcing link 115 into rigid engagement with link 117 and forcing link 80 into rigid engagement with link 116. The points X and Y are forced toward each other and will be at a fixed distance from each other, independent of their respective positions.

When the above-noted rigid connections are made, lever 91 rotates about pivot point 87, actuating ratchet 105 which assumes one of 16 positions depending on the position of point 112. Similarly, lever 92 rotates about pivot point 88, actuating ratchet 106 which assumes one of 16 positions depending on the position of point 113.

It is noted that the yoke and pin arrangements 85 and 86 are shown in FIGURE 1 at the upper and lower ends of member 82, while they are shown in FIGURE 2 at positions to the right of these ends. The latter arrangement is shown in the line action diagram of FIGURE 3. Either of these locations is possible, the operation of the yoke and pin arrangements 85 and 86 as releasable attaching mechanisms being the same in both cases.

As stated above, each ratchet segment 105 and 106 has 16 teeth, each tooth of segment 105 corresponding to one of the positions assumed by point 112, and each tooth of segment 106 corresponding to one of the positions assumed by point 113. Due to the various linkages and motions, each position of point 112 and point 113 cannot be precise, i.e., exactly the same each time it is actuated by the combination of input signals. However, these positions can be made to be accurate within a fraction of one tooth in the ratchet segment. As a matter of fact, it has been found experimentally that the accuracy of the positions of points 112 and 113 can be kept to within one-quarter of a tooth.

After the drivers have reached their final positions, lock magnet 102 and stop magnet 103 are both released. When stop magnet 103 is released, pawl actuating lever 104 will force the pawls into engagement with the corresponding teeth which have been positioned by levers 91 and 92 in response to the movements of the drivers. When lock magnet 102 is released, arm 120 is pivoted, forcing yoke 108 against member 81 which will tend to pivot about point 107, thereby removing the rigid engagement between links 115 and 117, and links 80 and 116, respectively. The points X and Y will then be forced apart; this action then forces the flank of one tooth on each of ratchet segments 105 and 106 further against the corresponding pawl. When all play in the mechanism has been removed the movement of the ratchet segments stops and the pawls are locked in place with the particular teeth determined by the driven positions of points 112 and 113.

After magnets 102 and 103 have been released, point Y will assume a final position corresponding to a permutation of the final positions assumed by the cam segments 105 and 106, and head 100 is driven by point Y to assume the corresponding same final position. Stated in another way, the 16 positions of the ratchet segment 105 will bring the head to one of a group of 16 tracks on disc 101; each position of the ratchet segment 106 will bring the head to one track in each of such groups.

It is noted that, while head 100 moves in an arcuate path across disc 101 since the head is pivoted at 107, the movement of the head will be substantially sinusoidal in response to the substantially sinusoidal movements imparted to the levers and transmitted by them to head 100 through the various linkages described. In addition, it is noted that while only one head 100 is shown in FIGS. 1 and 2, the positioner shown could be used to actuate more than one head, all moving in the same manner across different faces of respective discs. Thus, three heads could be attached to head arm 84, i.e., two additional heads in addition to head 100, the second head coacting with the opposite face of disc 101, and the third head coacting with a face of a second disc. The desired individual head could be selectively electrically activated as desired in a manner well-known in the art. Thus, the invention is particularly advantageous in arrangements wherein a large number of discs, storing a large amount of information, are used. Where a large number of discs are employed, the positioner according to the invention permits not only this economical use of the mechanism but also gives the considerable advantage, as stated above, of minimizing shocks and vibration. The latter desideratum is essential where a large amount of information is under consideration.

Figure 3:
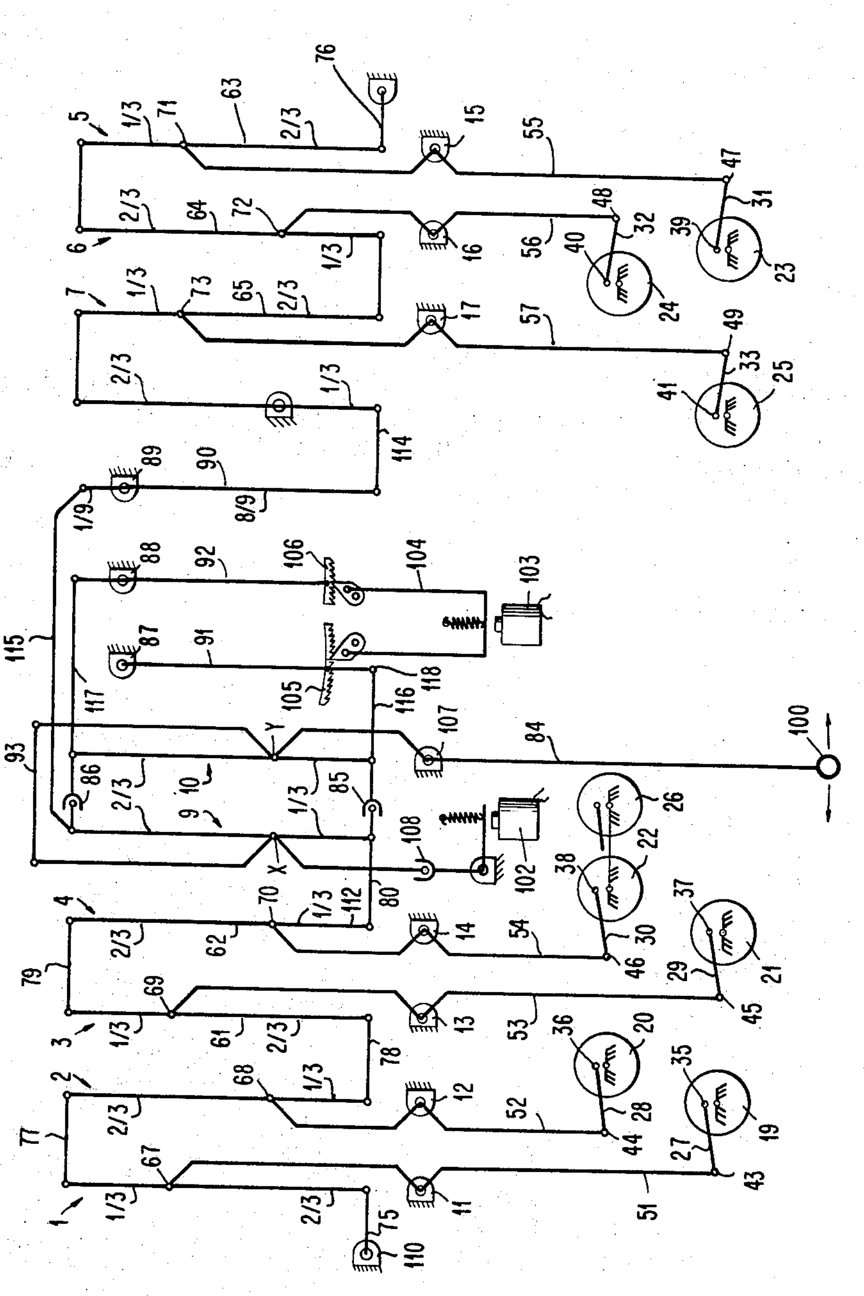
FIG. 3 is a line action diagram of another embodiment of the invention.

FIG. 3 shows a modification of the device of FIG. 1, like elements being designated by like reference numerals. As shown in FIG. 3, the driver 26 is coupled with driver 22, both serving to drive lever 4. In this modification, the same binary input pulse is applied to both drivers 22 and 26, thus providing in effect a device with seven binary inputs. Such an arrangement may be advantageous due to the high loads on drivers 22 and 26 of FIG. 1, since these drivers supply one-half of the total mechanism stroke.

With the seven inputs of FIG. 3, a total of 128 tracks can be served. As shown in FIG. 3, ratchet segment 106 in this modification has eight teeth, corresponding to the three input drivers 23, 24 and 25; ratchet segment 105 has 16 teeth, as in the embodiment of FIG. 1. Except for the difference in the number of input drivers, the operation of the mechanism of FIG. 3 is the same as that of FIG. 1. While the head 100 of FIG. 3 can serve only 128 tracks, the positioner of FIG. 3 can be made to serve 256 tracks by placing an additional head on head arm 84. If the disc 101 were divided into two zones of 128 tracks each, then each head could scan a particular zone, the desired head (and track) being selected electrically. Thus, 256 tracks could be utilized with the positioner of FIG. 3 as well as that of FIG. 1.

FIG. 4 is an enlarged view of one of the differential levers 1–8 of FIGS. 1–3 together with its associated driver. All of the levers 1–8 may be constructed as shown in FIG. 4; for this reason, the designations to the elements thereof are given in letters. The two rigid members of the differential lever are C and D, member C being in the form of a U-shape and adapted to be pivoted when a shaft is placed in bore G. Rigid member D forms a turning pair with member C; the two members may be attached to form the turning pair by means of a pin F. As can be seen, the pin F is located at a point which divides member D into portions one of which has a length which is twice that of the other. In order to take up torsional forces, member D is preferably made hollow as shown. A pin E is rigidly attached at one end of member D and a similar pin is attached at the other end thereof. The pins E serve to connect the lever with preceding and succeeding links such as links 75 or 77–79 in FIGS. 1–3. The motor A is shown in FIG. 4 in one of its stable final positions, motor link B being in its corresponding position and serving to drive the differential lever to the position shown. The other positions of the motor link B and the differential lever in response to the other stable position of the motor are shown in dash lines. While members C and D are shown aligned in both positions, it will be appreciated that in operation this will generally not be the case. Members C and D will be at an angle to each other depending on the positions of the other motors and levers. A stop element N is shown for positively stopping the motor in either of its final positions 180° apart. The stop element N coacts with a motor coupling H as shown, coupling H serving to couple the motor shaft to the motor link B.

FIG. 6 is a plan view of a different configuration for the stop element and the motor coupling, in which these may be combined. Motor coupling M of FIG. 6 has a portion of its periphery in the form of a semicircle in which two notches O are formed, one side J of the notches extending beyond the other side. A spring-loaded stop element K is adapted to fit into the notch against the longer side thereof and serves to stop the motor in one of its two stable positions, the other stable position of the motor being shown in dash lines. Stop element K is shown in FIG. 6 as actuating a switch P. The purpose of this switch will be given in connection with the description of FIG. 7.

It is noted that various couplings from lever B to the motor are given for illustrative purposes only in order to enable ready practice of the invention. Various other couplings and stop elements are possible and will readily occur to those skilled in the art. For example, if the synchronous motor used is of the type which has two stators and two rotors, such as the Philips type AU5050, then the motor coupling can be located between the two rotors. The particular configuration of the coupling and stop element forms no part of the invention.

Figure 5:
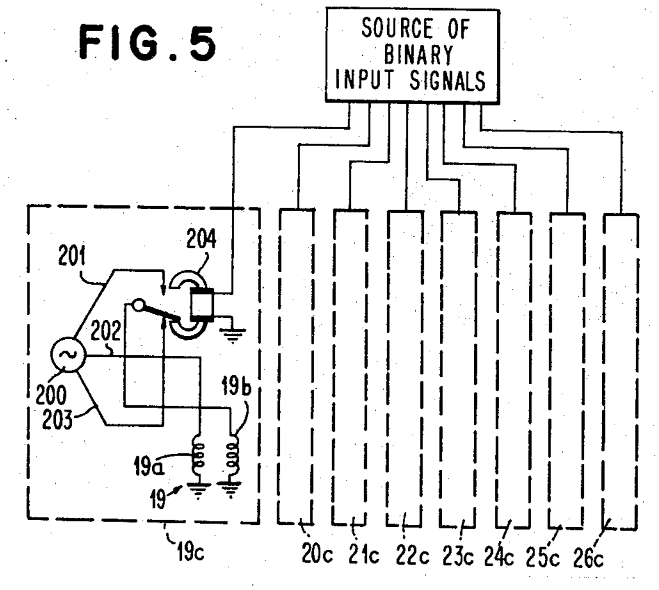
FIG. 5 is a schematic circuit diagram of an arrangement for starting the drivers.

FIG. 5 is a schematic diagram of a circuit which may be used for actuating the synchronous motors 19–26. A circuit 19*c* for actuating motor 19 is shown enclosed in dash lines. This circuit includes a polarized relay 204 to which the corresponding binary input signal is applied from the source of binary input signals as shown. Reference numeral 200 represents a voltage source with three outputs 201, 202 and 203 which are 90° out-of-phase with each other; voltage source 200 may be a single source such as an alternator having the required phase-displaced output voltages or it may be three separate sources. The stator coils of motor 19 are shown at 19*a* and 19*b*. The voltage at output 202 is permanently applied to coil 19*a* and the direction of rotation of the motor depends on the phase difference of the voltage on coil 19*b* relative to the voltage on coil 19*a*. In response to a binary input signal of one polarity, therefore, relay 204 will be actuated and will couple output 201 to coil 19*b*; this output has a voltage which is phase-displaced 90° in one direction with respect to the voltage on coil 19*a*, thus actuating the motor 19 in one direction. In response to a binary input signal of the other polarity, relay 204 will be actuated and will couple output 203 to coil 19*b*; this output has a voltage which is phase-displaced 90° with respect to the voltage on coil 19*a* in a direction opposite to that of output 201, and the motor will thus be actuated in the opposite direction.

The starting circuits for motors 20–26 are each identical to that for motor 19 and have therefore been indicated in FIG. 5 only by dash lines as shown.

Figure 7:
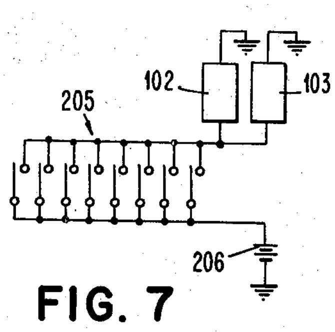
FIG. 7 is a schematic circuit diagram of the operating circuit of the electromagnets.

FIG. 7 is a schematic diagram of a circuit which may be used for operating the lock magnet 102 and the stop magnet 103. As stated above in connection with the operation of the fine positioning mechanism, both of these magnets are energized during the time that the motors are operating and both are de-energized when the motors have stopped. To this end, an energization source 206 shown in FIG. 7 is connected in series with each of magnets 102 and 103 through a plurality of parallel-connected switches P, each corresponding to one of the motors 19–26. As noted above in connection with FIG. 6, each motor may have an associated switch P which is open when the motor is stopped and is closed while the motor is in motion. Thus, magnets 102 and 103 will be energized in response to the actuation and movement of any of the motors 19–26 and will be de-energized when the motors have stopped.

It is noted that the various levers and couplings are shown in the pictorial representation of FIG. 2, for the sake of clarity, as being in a substantially side-by-side relationship. It will be apparent that the positions of the levers and couplings may be arranged as desired in practice so as to achieve as compact a structure as possible, provided that the relative intercouplings disclosed for achieving the desired motion reduction and addition are maintained.

It is thus seen that applicant has devised a novel positioner for magnetic heads which provides rapid access to desired tracks of multitrack magnetic records with a minimum of shock and vibration.

While the invention has been described with respect to specific embodiments, various changes and modifications will be readily apparent to those skilled in the art without departing from the inventive concept, the scope of which is set forth in the appended claims.

What I claim is:

1. Positioning apparatus for positioning at least one magnetic transducer adjacent one track of a plurality of tracks on a magnetic record carrier, comprising: a plurality of driver means, each driver being adapted to be driven into one of two positions in response to an input signal, a plurality of differential levers corresponding in number to said plurality of driver means, a plurality of coupling means each coupling one driver to its corresponding differential lever, said coupling means imparting a substantially sinusoidal movement to each lever in response to a change in position of the corresponding driver, each lever having two ends which are a fixed distance apart and are at different distances respectively from an intermediate point actuated by said coupling means, a plurality of link means linking together predetermined ends of said levers, and at least one magnetic head coupled to said link means, said head having a substantially sinusoidal movement in response to the substantially sinusoidal lever movements and assuming a particular position determined by the particular positions of said plurality of driver means in response to an input signal.

2. Positioning apparatus for positioning at least one magnetic transducer adjacent one track of a plurality of tracks on a magnetic record carrier, comprising: first and second pluralities of driver means, each driver being adapted to be driven into one of two positions in response to an input signal, first and second pluralities of differential levers corresponding in number to said first and second pluralities of driver means respectively, a plurality of coupling means each coupling one driver to its corresponding differential lever, said coupling means imparting a substantially sinusoidal movement to each lever in response to a change in position of the corresponding driver, each lever having two ends which are a fixed distance apart and are different distances apart from an intermediate point actuated by said coupling means, a first plurality of link means linking together predetermined ends of said first plurality of levers, a second plurality of link means linking together predetermined ends of said second plurality of levers, first and second ratchet members releasably coupled to said first and second pluralities of links respectively, first and second detent means releasably engaging said first and second ratchet means respectively, means for positively coupling said ratchet members to the respective pluralities of links during the movement of each driver, means for disengaging the detent means from the respective ratchet members during the movement of each driver, means for decoupling said ratchet members from the respective pluralities of links and means for engaging the detent means with the respective ratchet members when the drivers reach said positions, and at least one magnetic head coupled to said first and second ratchet means, said head having a substantially sinusoidal movement in response to the substantially sinusoidal lever movements and assuming a particular position determined by the particular positions of said first and second ratchet means.

3. Positioning apparatus for a magnetic head comprising: first and second pluralities of synchronous motors, circuit means for applying binary input signals to said motors for driving each motor into one of two distinct positions in response to a particular binary input signal, first and second series of differential levers, each lever having a driven point and two output points, coupling means for coupling the driven point of each differential lever to a corresponding one of said motors, said coupling means imparting a substantially sinusoidal motion to the driven point and output points of each differential lever, one output point of each lever moving a distance substantially one-half that of the other output point, link means coupling the one output point of one lever to the other output point of the next succeeding lever in each of said series of levers, whereby the one output point of the last lever of each of said first and second series of levers assumes a plurality of distinct positions determined by the respective distinct positions of said first and second pluralities of motors, lever means for permuting said plurality of distinct positions into a plurality of final positions, and at least one magnetic head coupled to said lever means, said magnetic head assuming a plurality of distinct positions corresponding to said plurality of final positions of said lever means.

4. Positioning apparatus for positioning at least one magnetic transducer adjacent one track of a plurality of tracks on a magnetic record carrier, comprising: first and second pluralities of driver means, each driver being adapted to be driven into one of two positions in response to an input signal, first and second pluralities of differential levers corresponding in number to said first and second pluralities of driver means respectively, each lever being pivotable about a pivot point and having two ends which are a fixed distance apart and are different distances apart from an intermediate point actuated by said coupling means, a plurality of coupling means each coupling one driver to its corresponding differential lever, said coupling means pivoting each lever about its pivot point and imparting a substantially sinusoidal movement to each lever in response to a change in position of the corresponding driver, a first plurality of link means linking together predetermined ends of said first plurality of levers, a second plurailty of link means linking together predetermined ends of said second plurality of levers, first and second ratchet members rigidly attached to first and second pivotable levers, said ratchet members and said first and second pivotable levers being releasably coupled to said first and second pluralities of levers respectively, first and second detent means releasably engaging said first and second ratchet means respectively, means for positively coupling said first and second pivotable levers and said ratchet members to the respective pluralities of levers during the movement of each driver thereby pivoting said pivotable levers, means for disengaging the detent means from the respective ratchet members during the movement of each driver, means for decoupling said ratchet members from the respective pluralities of levers and means for engaging the detent means with the respective ratchet members when the drivers reach said positions, and at least one magnetic head coupled to said first and second ratchet means, said head having a substantially sinusoidal movement in response to the substantially sinusoidal lever movements and assuming a particular position determined by the particular positions of said first and second ratchet means.

References Cited

UNITED STATES PATENTS

| | | | |
|---|---|---|---|
| 3,314,057 | 4/1967 | Mogtader | 340—174.1 |
| 3,124,791 | 3/1964 | Welsh et al. | 340—174.1 |
| 3,052,874 | 9/1962 | Krakinowski et al. | 340—174.1 |

TERRELL W. FEARS, *Primary Examiner.*

BERNARD KONICK, *Examiner.*

A. I. NEUSTADT, *Assistant Examiner.*